(12) United States Patent  
Ishida

(10) Patent No.: US 11,306,025 B2  
(45) Date of Patent: Apr. 19, 2022

(54) MANUFACTURING METHOD OF OPTICAL FIBER

(71) Applicant: FUJIKURA LTD., Tokyo (JP)

(72) Inventor: Itaru Ishida, Suzuka (JP)

(73) Assignee: FUJIKURA LTD., Tokyo (JP)

( * ) Notice: Subject to any disclaimer, the term of this patent is extended or adjusted under 35 U.S.C. 154(b) by 44 days.

(21) Appl. No.: 16/477,696

(22) PCT Filed: Feb. 8, 2018

(86) PCT No.: PCT/JP2018/004471  
§ 371 (c)(1),  
(2) Date: Jul. 12, 2019

(87) PCT Pub. No.: WO2018/189991  
PCT Pub. Date: Oct. 18, 2018

(65) Prior Publication Data  
US 2019/0359520 A1    Nov. 28, 2019

(30) Foreign Application Priority Data

Apr. 10, 2017 (JP) .............................. JP2017-077688

(51) Int. Cl.
```
C03B 37/025      (2006.01)
C03C 25/106      (2018.01)
C03C 25/12       (2006.01)
C03C 25/26       (2018.01)
```
(52) U.S. Cl.  
CPC ............ *C03C 25/12* (2013.01); *C03B 37/025* (2013.01); *C03C 25/26* (2013.01)

(58) Field of Classification Search  
CPC ....... C03C 25/12; C03C 25/26; C03C 25/106; C03B 37/025  
See application file for complete search history.

(56) References Cited

U.S. PATENT DOCUMENTS

| 9,096,464 B2 | 8/2015 | Okada |
| 2003/0039749 A1 | 2/2003 | Overton et al. |
| 2009/0158779 A1 | 6/2009 | Faler et al. |

(Continued)

FOREIGN PATENT DOCUMENTS

| CN | 1190084 A | 8/1998 |
| CN | 1630621 A | 6/2005 |

(Continued)

OTHER PUBLICATIONS

International Search Report issued in corresponding international application No. PCT/JP2018/004471 dated May 1, 2018 (2 pages).

*Primary Examiner* — Cynthia Szewczyk  
(74) *Attorney, Agent, or Firm* — Osha Bergman Watanabe & Burton LLP

(57) ABSTRACT

An optical fiber manufacturing method includes: drawing an optical fiber preform to form a bare optical fiber; cooling the bare optical fiber; coating an uncured coating layer that includes a resin precursor on an outer periphery of the bare optical fiber; curing the uncured coating layer to form a semi-cured coating layer; further curing the semi-cured coating layer; and cooling the semi-cured coating layer by at least one non-contact direction changer between the curing of the uncured coating layer and the curing of the semi-cured coating layer.

4 Claims, 2 Drawing Sheets

(56) References Cited

U.S. PATENT DOCUMENTS

2009/0217710 A1* 9/2009 Costello, III ....... C03B 37/0253
                                                    65/379
2016/0229734 A1* 8/2016 Okada ................ C03B 37/0253
2017/0144930 A1* 5/2017 Moore ................ C03C 25/1065

FOREIGN PATENT DOCUMENTS

| CN | 1882513 A | 12/2006 | | |
|---|---|---|---|---|
| CN | 102083762 A | 6/2011 | | |
| CN | 103988103 A | 8/2014 | | |
| CN | 106116138 A | 11/2016 | | |
| EP | 0854022 A1 | 7/1998 | | |
| JP | 2011-523397 A | 8/2011 | | |
| JP | 2013-082594 A | 5/2013 | | |
| JP | 2015-083534 A | 4/2015 | | |
| JP | 5851636 B1 | 2/2016 | | |
| JP | 2016-124727 A | 7/2016 | | |
| WO | WO-2017077895 A1 * | 5/2017 | ............... | G02B 6/44 |

* cited by examiner

MANUFACTURING METHOD OF OPTICAL FIBER

CROSS REFERENCE TO RELATED APPLICATIONS

This is a national stage application of International Application No. PCT/JP2018/004471 filed Feb. 8, 2018, which claims priority to Japanese Patent Application No. 2017-077688 filed Apr. 10, 2017, both of which are incorporated herein in their entirety.

TECHNICAL FIELD

The present invention relates to an optical fiber manufacturing method.

BACKGROUND

In the related art, an optical fiber manufacturing method including a drawing step, a coating step, and a curing step has been known. In the drawing step, an optical fiber preform is drawn to form a bare optical fiber. In the coating step, a coating layer which is uncured (hereinafter, simply referred to as an uncured coating layer) made of resin is provided on the outer periphery of the bare optical fiber. In the curing step, the uncured coating layer is cured.

In such a manufacturing method, in order to increase the production capacity of an optical fiber, it is necessary to increase a drawing speed. However, if the drawing speed is increased, the time for the optical fiber to pass through a cooling device or a coating curing device becomes short, so it is necessary to increase the number of these devices.

Further, if a high temperature bare optical fiber drawn from a melting furnace is slowly cooled by a slow-cooling furnace, a transmission loss, which is one of the important characteristics of an optical fiber, can be reduced. Therefore, in order to increase the drawing speed while limiting the increase in transmission loss, it is necessary to increase the number of slow-cooling furnaces.

Here, a bare optical fiber for which the coating layer is not provided and which is easily damaged passes through the slow-cooling furnace. In addition, an optical fiber having a liquid uncured coating layer is passed through the coating curing device. If the optical fiber in these states is brought into contact with a pulley or the like for changing the direction, it may cause the reduction of the strength of the optical fiber, and the deformation of the coating layer. Therefore, each device needs to be located directly below the melting furnace of the optical fiber preform.

As described above, in order to raise the production capacity of an optical fiber, it is necessary to increase the number of devices disposed directly below a melting furnace. However, in the existing factory building where the space in the height direction is limited, it is difficult to increase the number of devices in this manner, which results in the limitation of drawing speed.

As a technology for overcoming this limitation, Patent Document 1 discloses a non-contact direction changer. The non-contact direction changer can change the traveling direction of the optical fiber without bringing its components into contact with the optical fiber. By using the non-contact direction changer, it is possible to change the traveling direction of the optical fiber even before the uncured coating layer is formed or the uncured coating layer is completely cured. Thus, each device can be disposed freely, and the drawing speed can be increased even in a place where there is a space limitation in the height direction.

PATENT LITERATURE

[Patent Document 1] Japanese Patent No. 5851636

Meanwhile, as a coating layer of an optical fiber, an ultraviolet-curable resin which can be cured at high speed is generally used. In a case where the ultraviolet-curable resin is used as the coating layer, an ultraviolet lamp, a UV-LED or the like is employed as the coating curing device. Here, it is known that when curing an ultraviolet-curable resin, the temperature at the time of curing of the resin is a factor that determines the degree of curing and the molecular weight of the resin after curing. For example, if the temperature at the time of curing is too high, the curing may be insufficient or the characteristics such as Young's modulus may deteriorate because the molecular weight of the resin after curing is small. In particular, as the drawing speed increases, the insufficiency of the curing or the deterioration of Young's modulus is more likely to occur because the time spent for cooling the bare optical fiber or the uncured coating layer becomes shorter. Further, in order to stably coat the resin material to be the coating layer on the bare optical fiber, the temperature of the resin material may be increased for the purpose of reducing the viscosity of the resin material. Increasing the temperature of the resin material to adjust the viscosity may also be a factor to increase the temperature of the uncured coating layer. Receiving the heat emitted by an ultraviolet lamp or the like may also be a factor to increase the temperature of the uncured coating layer.

SUMMARY

One or more embodiments of the present invention provide a manufacturing method of an optical fiber having a coating layer in a chosen or desired state while increasing the drawing speed of the optical fiber.

An optical fiber manufacturing method according to one or more embodiments of the present invention includes a drawing step of drawing an optical fiber preform to form a bare optical fiber; a first cooling step of cooling the bare optical fiber; a coating step of providing an uncured coating layer containing a resin precursor on an outer periphery of the bare optical fiber; a first curing step of curing the uncured coating layer to form a semi-cured coating layer; a second curing step of further curing the semi-cured coating layer; and a second cooling step of cooling the semi-cured coating layer by at least one non-contact direction changer between the first curing step and the second curing step.

According to one or more embodiments of the present invention, it is possible to manufacture an optical fiber having a coating layer in a chosen or desired state while increasing the drawing speed of the optical fiber.

DETAILED DESCRIPTION

The configuration of an optical fiber manufacturing apparatus according to one or more embodiments will be described below with reference to FIG. 1. In each drawing used in the following description, the scale is appropriately changed in order to make each member recognizable.

Figure 1:
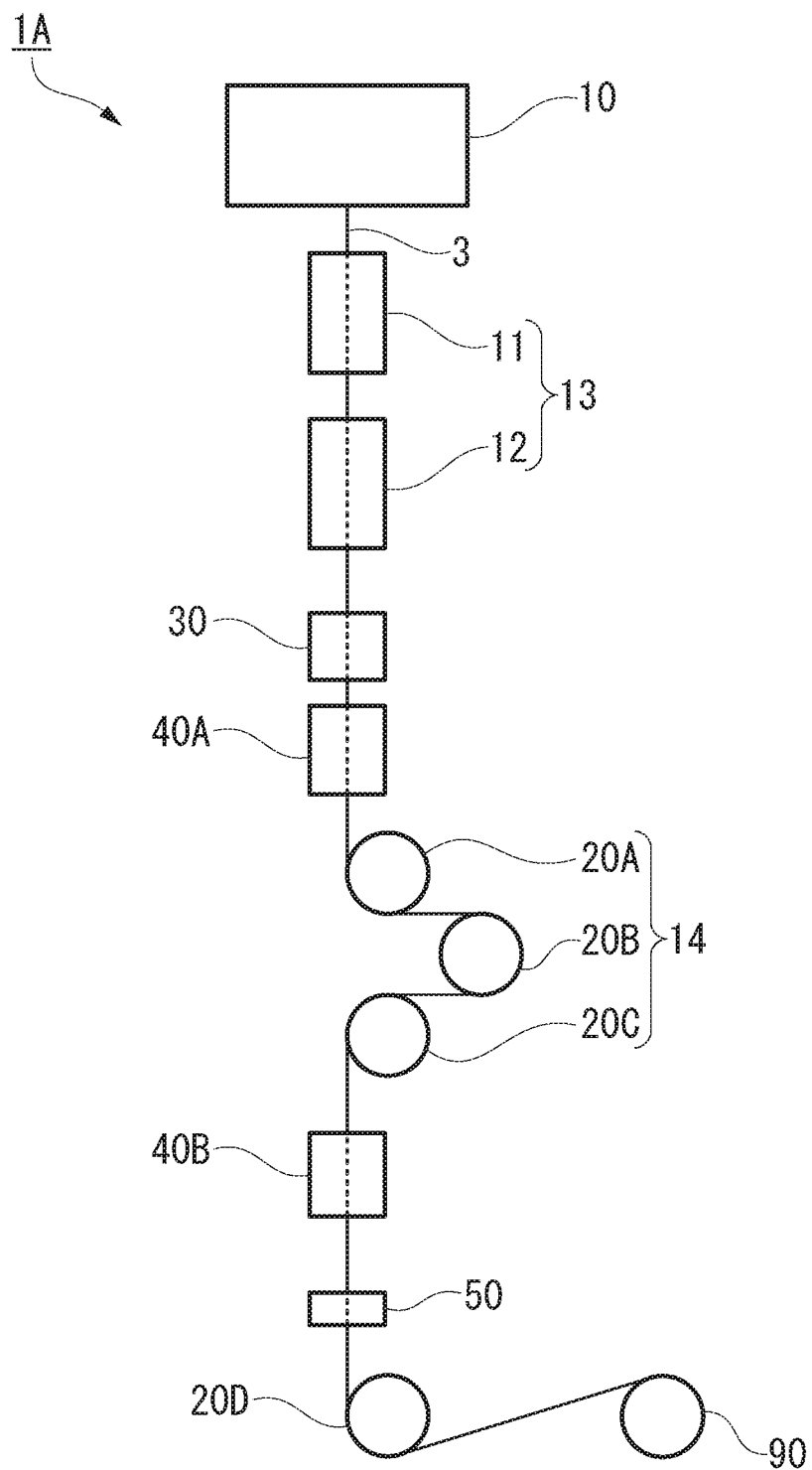
FIG. 1 is a schematic view showing a configuration of an optical fiber manufacturing apparatus according to one or more embodiments.

As shown in FIG. 1, the optical fiber manufacturing apparatus 1A includes a drawing unit 10, a first cooling unit 13, a coating unit 30, a first curing unit 40A, non-contact direction changers 20A to 20C, a second curing unit 40B, an outer diameter measurement unit 50, a direction changer 20D, and a winder 90, and the respective units are disposed in this order from the top.

The drawing unit 10 includes a melting furnace or the like for melting an optical fiber preform. The drawing unit 10 forms a bare optical fiber 3.

The first cooling unit 13 includes a slow-cooling furnace 11 and a cooler 12. The slow-cooling furnace 11 is a device for gradually cooling the high temperature bare optical fiber 3 drawn from the melting furnace of the drawing unit 10. By slowly cooling the bare optical fiber 3 by the slow-cooling furnace 11, the transmission loss of the optical fiber can be reduced. As the cooler 12, a cooling cylinder or the like can be employed. The cooling cylinder introduces gas into the cavity of the water-cooled cylinder, and passes the optical fiber through the cavity to cool the optical fiber. The gas introduced into the cavity includes helium, nitrogen, carbon dioxide, or a mixed gas thereof. For example, the heat transfer rates of helium and nitrogen are different. Therefore, in a case of introducing a mixed gas of helium and nitrogen into the cavity, it is possible to adjust the temperature of the bare optical fiber 3 passing through the cooling cylinder by changing the mixing ratio of these gases.

The coating unit 30 applies or coats a fluid material (hereinafter, simply referred to as a resin material) containing a resin precursor to the outer periphery of the bare optical fiber 3 by die coating or the like to form an uncured coating layer. In one or more embodiments, the coating layer in the state before passing through the first curing unit 40A is referred to as "uncured coating layer", and the coating layer in the state after passing through the first curing unit 40A and before passing through the second curing unit 40B is referred to as "semi-cured coating layer". Further, in a case where it does not matter whether the coating layer passes through the curing units 40A, 40B or not, it is simply referred to as a "coating layer".

The coating of the resin material is, for example, a two-layer coating. In the two-layer coating, a resin material for a primary coating layer with a low Young's modulus is applied to the inside, and a resin material for a secondary coating layer with a high Young's modulus is applied to the outside. For example, an ultraviolet-curable resin such as a urethane acrylate resin can be used as the coating layer. In addition, the coating unit 30 may be configured to coat a primary coating layer and a secondary coating layer separately, or to coat a primary coating layer and a secondary coating layer simultaneously. In one or more embodiments, an element which is in a state where the coating layer is provided on the outer periphery of the bare optical fiber 3 is referred to as an optical fiber.

In order to realize a stable coating, the viscosity of the resin material applied to the bare optical fiber 3 by the coating unit 30 needs to be low to some extent. The viscosity of the resin material can be reduced by raising the temperature of the resin material. Therefore, the temperature of the resin material to be applied by the coating unit 30 may be previously raised above room temperature, which may be one of the factors causing the temperature of the uncured coating layer to rise. In particular, as the viscosity of the resin material at room temperature is higher, it is necessary to raise the temperature of the resin material when applied by the coating unit 30.

In the case where the coating layer is made of an ultraviolet-curable resin, an ultraviolet irradiation lamp, a UV-LED, and a curing device in which these are combined may be used as the first curing unit 40A. The number of curing devices disposed as the first curing unit 40A may be determined, with the curing degree K of the coating layer that has passed these curing devices as an index. In addition, the curing degree K in one or more embodiments is defined using the gel fraction to be described later.

The plurality of non-contact direction changers 20A, 20B, 20C are disposed below the first curing unit 40A in this order. The non-contact direction changers 20A, 20B, 20C change the traveling directions of the optical fiber by 90°, 180°, and 90°, respectively. For example, the non-contact direction changer 20A changes the traveling direction of the optical fiber by about 90° from the downward direction to the horizontal direction. The number of installed non-contact direction changers, the installation position, the angle of direction change, or the like may be converted as appropriate.

The non-contact direction changers 20A to 20C have guide grooves for guiding the bare optical fiber 3 or the optical fiber. In the guide groove, an outlet for fluid (gas) for floating the optical fibers wired along the guide groove is formed. The non-contact direction changers 20A to 20C float the optical fiber, without contacting the component with the optical fiber, by spraying gas such as air or helium (He) onto the optical fiber from the outlet. The configuration of the non-contact direction changer in one or more embodiments is the same as the configuration described in Japanese Patent No. 5851636, and thus a detailed description is omitted here.

In a case where air is used as the gas sprayed onto the optical fiber, the amount of gas required to float the optical fiber is, for example, about 100 to 200 L/min. The amount of gas is appropriately changed depending on the width of the gas outlet and the like. By adjusting the amount of gas, it is possible to adjust the floating amount of the optical fiber, that is, the passing position of the optical fiber with respect to each component.

When the passing position of the optical fiber changes significantly, the optical fiber comes in contact with each component, which causes the strength of the optical fiber to be reduced. Further, a UV-LED may be used as a curing device for the first curing unit 40A or the second curing unit 40B. Since the irradiation light of the UV-LED has directivity, the area in which the ultraviolet ray can be irradiated is relatively small. Therefore, in order to irradiate ultraviolet ray to the uncured coating layer or the semi-cured coating layer reliably, it is necessary to control the passing position of the optical fiber more strictly. Therefore, a position sensor (not shown) is disposed below the non-contact direction changers 20A to 20C, and the position sensor measures the position of the optical fiber. The amount of gas to be sprayed onto the optical fiber by the non-contact direction changers 20A to 20C is adjusted such that the position of the optical fiber is an appropriate position, based on the measurement result.

In the case where the coating layer is a radical-curable ultraviolet-curable resin which is cured by radical polymerization, if the oxygen concentration of the gas sprayed onto the optical fiber is high, curing failure occurs due to oxygen inhibition. Therefore, the oxygen concentration of the gas sprayed onto the optical fiber by the non-contact direction changers 20A to 20C needs to be controlled to an appropriate value. For example, in a case where air is used as the gas, the oxygen concentration of the gas can be adjusted by increasing or decreasing the contents of gases other than oxygen, such as nitrogen contained in the air.

However, when a gas is sprayed onto the optical fiber, the coating layer can be cooled by the gas. The non-contact direction changers 20A to 20C in one or more embodiments are disposed between the first curing unit 40A and the second curing unit 40B, focusing on the cooling capacity. That is, the non-contact direction changers 20A to 20C constitute the second cooling unit 14 that cools the semi-cured coating layer between the first curing unit 40A and the second curing unit 40B.

Next, an optical fiber manufacturing method using the optical fiber manufacturing apparatus 1A configured as described above will be described.

First, in the drawing unit 10, the optical fiber preform is drawn to form a bare optical fiber 3 (drawing step).

Next, in order to keep the transmission loss of the optical fiber low, the bare optical fiber 3 is gradually cooled in the slow-cooling furnace 11. Further, the bare optical fiber 3 is cooled to a predetermined temperature by the cooler 12 (first cooling step).

Next, in the coating unit 30, an uncured coating layer containing a resin precursor is provided on the outer periphery of the bare optical fiber 3 to form an optical fiber (coating step). At this time, the temperature of the resin material applied as the uncured coating layer is previously raised above room temperature in order to reduce its viscosity.

Next, in the first curing unit 40A, the uncured coating layer is cured to become a semi-cured coating layer (first curing step). In addition, the semi-cured coating layer of the optical fiber which passes through the first curing unit 40A is further heated up with the heat or the like emitted by a curing device.

Next, between the first curing step and the second curing step, the semi-cured coating layer is cooled while changing the traveling direction of the optical fiber by the non-contact direction changers 20A to 20C of the second cooling unit 14 (second cooling step).

Next, in the second curing unit 40B, the semi-cured coating layer is further cured (second curing step).

Next, in the outer diameter measurement unit 50, the outer diameter of the optical fiber is measured.

Then, the traveling direction of the optical fiber is changed to a substantially horizontal direction by the direction changer 20D, and the optical fiber is wound by the winder 90. In addition, since the coating layer of the optical fiber which passed the second curing unit 40B has already been cured, direction changers, such as a contact-type pulley, can be used as direction changer 20D.

Next, one or more embodiments of the present invention will be described, but the basic configuration is the same as that discussed above with reference to FIG. 1. Therefore, the same reference numerals are given to similar configurations, the explanation thereof will be omitted, and only differences therefrom will be described.

One or more embodiments discussed below include a different configuration of the second cooling unit 14 and the arrangement of the second curing unit 40B.

Figure 2:
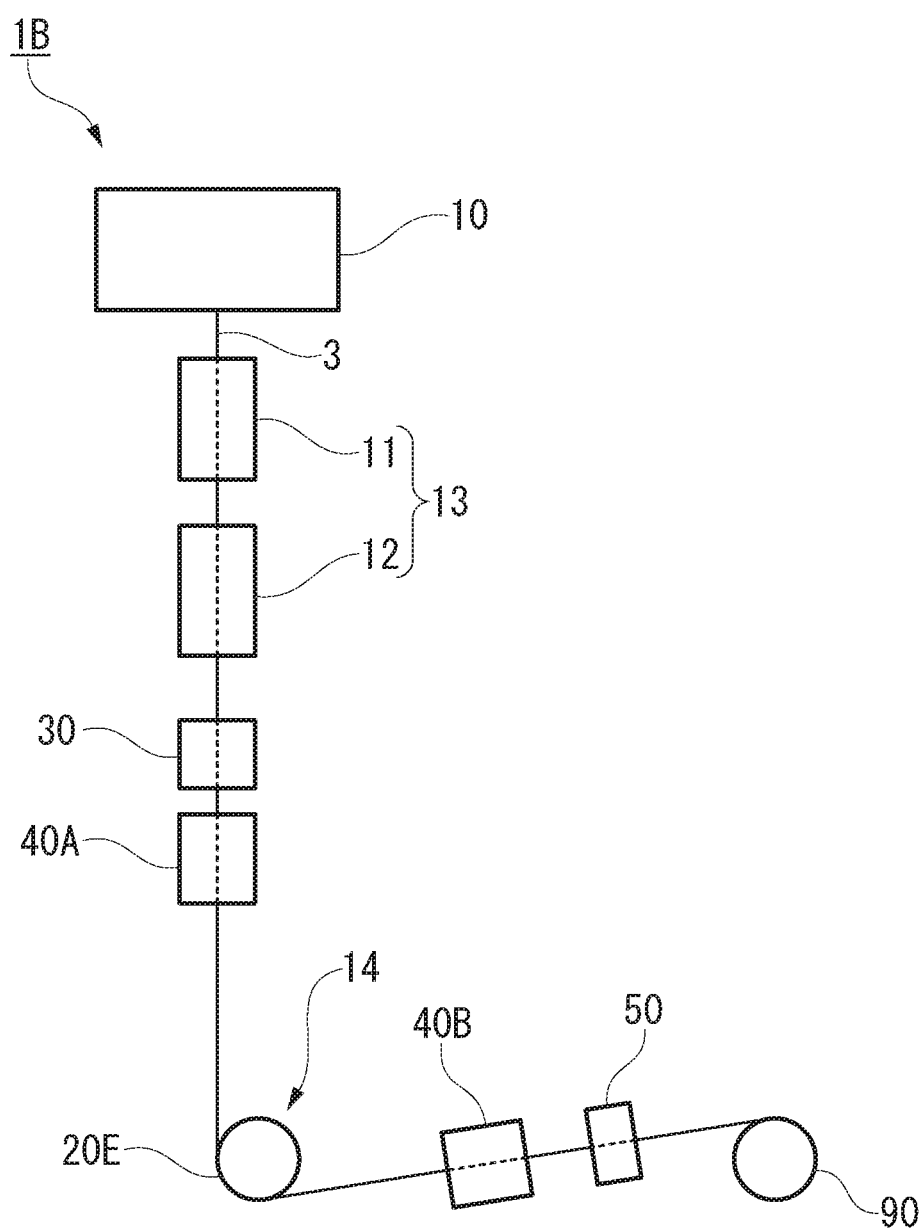
FIG. 2 is a schematic view showing a configuration of an optical fiber manufacturing apparatus according to one or more embodiments.

As shown in FIG. 2, in the optical fiber manufacturing apparatus 1B of one or more embodiments, the second cooling unit 14 is disposed at the lowermost portion of the optical fiber manufacturing apparatus 1B. The second cooling unit 14 is formed of one non-contact direction changer 20E. The non-contact direction changer 20E changes the traveling direction of the optical fiber by about 90° from the downward direction to the horizontal direction.

According to one or more embodiments, the second cooling unit 14, the second curing unit 40B, and the outer diameter measurement unit 50 are disposed at the lowermost portion of the optical fiber manufacturing apparatus 1B. Therefore, the size in the up-down direction of the entire optical fiber manufacturing apparatus can be reduced.

EXAMPLE

Hereinafter, the optical fiber manufacturing method of one or more embodiments will be described in more detail using a specific example.

As Example 1, an optical fiber is manufactured by the optical fiber manufacturing apparatus 1A shown in FIG. 1. With the outer diameter of the bare optical fiber 3 as 125 μm, and the outer diameter of the optical fiber as 250 μm, two layers of ultraviolet-curable resin (urethane acrylate) are adopted as the coating layer. The drawing speed is 50 m/sec. Two ultraviolet irradiation lamps are installed as the first curing unit 40A. As the second cooling unit 14, three non-contact direction changers 20A, 20B, 20C are installed. The three non-contact direction changers 20A, 20B, 20C change the traveling directions of the optical fiber by 90°, 180°, and 90°, respectively. The gas sprayed onto the optical fiber by the non-contact direction changers 20A to 20C is air whose oxygen concentration is adjusted to 10%. Four ultraviolet irradiation lamps are installed as the second curing unit 40B.

The coating layer of the optical fiber obtained thereby is cured, and the characteristics of the coating layer are also good. The curing degree of the semi-cured coating layer after passing through the first curing unit 40A is K=0.25.

Here, the definition of the gel fraction and the curing degree K in this example will be described. The gel fraction is calculated by the following method. First, an optical fiber as a sample is input to a Soxhlet extractor, and Soxhlet extraction is performed using methyl ethyl ketone (MEK) as an extraction solvent, under conditions of a temperature of 90° C. and a time of 240 minutes. Thereafter, the sample is dried at a temperature of 60° C. for 240 minutes. The gel fraction is calculated by dividing the dry weight of the insoluble matter after the extraction by the weight of the sample before extraction. In addition, the temperature at the time of extraction may be a temperature higher than or equal to the boiling point of MEK, and may be the temperature and time at which extraction of elution is saturated. In addition, the dry weight may be saturated with respect to the temperature and time of drying.

The gel fraction increases with the increase of the UV irradiation amount to the coating layer, and saturates at a certain UV irradiation amount. The UV irradiation amount is a value obtained by multiplying the UV illuminance (mW/cm$^2$) from each UV irradiation device by each irradiation time (second). Further, the irradiation time in the optical fiber manufacturing apparatus is defined as a value obtained by dividing the distance (m) which the optical fiber in the UV irradiation device passes by the drawing speed (m/sec). That is, the relationship between the UV irradiation amount and the gel fraction can be obtained by preparing a plurality of samples by changing the drawing speed, the number of UV irradiation devices, or the UV illuminance, and evaluating the gel fraction of each sample.

Here, the lower limit value of the UV irradiation amount at which the gel fraction saturates is set to W1, and the saturated gel fraction at that time is set to G1. Next, a sample is prepared with a UV irradiation amount (W2) which is 1/10 of W1, and the gel fraction obtained thereby is defined as G2. Further, when the gel fraction of the sample to be evaluated is G3, the curing degree K of the sample to be evaluated is defined by the following Expression (1).

$$K=(G3-G2)/(G1-G2) \qquad (1)$$

As Example 2, an optical fiber is manufactured by the optical fiber manufacturing apparatus 1B shown in FIG. 2. One ultraviolet irradiation lamp is installed as the first curing unit 40A. As the second cooling unit 14, one non-contact direction changer 20E (90° conversion) is used. Two ultraviolet irradiation lamps are installed as the second curing unit 40B. The other configurations are the same as in Example 1. In the present example, the optical fiber is drawn at a drawing speed of 10 m/sec. The coating layer of the optical fiber obtained thereby is cured, and the characteristics of the coating layer are also good.

As Comparative Example 1, an optical fiber is manufactured at a drawing speed of 50 m/sec, with the configuration of FIG. 1 excluding the second cooling unit 14. Although the coating layer of the optical fiber obtained thereby way is cured, the Young's modulus of the coating layer is reduced by about 20% as compared with Example 1. This is because in a state where the semi-cured coating layer is kept heated by passing through the first curing unit 40A, the optical fiber enters the second curing unit 40B and is cured at a state where the temperature of the semi-cured coating layer is high. That is, since the semi-cured coating layer is cured in a state where the temperature is higher than that in Example 1, the molecular weight of urethane acrylate as the coating layer decreases, and the Young's modulus decreases.

As Comparative Example 2, an optical fiber is manufactured at a drawing speed of 10 m/sec, by changing the non-contact direction changer 20E in the configuration of FIG. 2 to a contact-type direction changer (pulley). The cross sectional shape of the coating layer of the optical fiber obtained thereby is deformed and is not a perfect circle. This is because the optical fiber contacts the pulley in a state where the curing of the coating layer is insufficient before passing through the second curing unit 40B.

As Comparative Example 3, from the configuration of FIG. 1, the positions of the non-contact direction changers 20A to 20C are converted to the position between the coating unit 30 and the first curing unit 40A. In the optical fiber obtained by this configuration, the coating diameter is largely fluctuated in the longitudinal direction. This is because the uncured coating layer is deformed by the pressure of the gas, by spraying the gas from the non-contact direction changers 20A to 20C onto the optical fiber, in the uncured state of the coating layer.

As Comparative Example 4, in the configuration of Example 1, the gas sprayed onto the optical fiber by the non-contact direction changers 20A to 20C is air having an oxygen concentration of 20%. The optical fiber obtained thereby has insufficient curing of the coating layer and has a sticky surface. This is because the urethane acrylate adopted as the coating layer is a radical-curable ultraviolet-curable resin and the oxygen concentration of the sprayed gas is high to cause curing failure due to oxygen inhibition. Since the oxygen concentration of the gas in Example 1 is 10% and the oxygen concentration of the gas in Comparative Example 4 is 20%, in the second cooling step, the oxygen concentration of the gas sprayed onto the semi-cured coating layer of the optical fiber by the non-contact direction changers 20A to 20C may be 10% or less.

As Comparative Example 5, from the configuration of Example 1, the number of ultraviolet irradiation lamps used as the first curing unit 40A is changed to one. The drawing speed is 50 m/sec, which is the same as that of Example 1. The curing degree of the semi-cured coating layer after passing through the first curing unit 40A is K=0.20. The cross-sectional shape of the coating layer of the optical fiber obtained thereby is not a perfect circle. This is because as compared with Example 1, as a result of reducing the number of ultraviolet irradiation lamps to be installed as the first curing unit 40A, gases of the non-contact direction changers 20A to 20C are sprayed onto the optical fiber in a state where the curing of the coating layer is insufficient, and the coating layer is deformed.

The curing degree K of the semi-cured coating layer after passing through the first curing unit 40A is 0.25 in Example 1 and 0.20 in Comparative Example 5. From this, in the first curing step, the uncured coating layer may be cured until the curing degree K of the semi-cured coating layer becomes 0.25 or more. The faster the drawing speed, the shorter the time for the optical fiber to pass through one curing device, and the smaller the amount of ultraviolet light absorbed by the uncured coating layer or the semi-cured coating layer. Therefore, the number of curing devices disposed as the first curing unit 40A may be adjusted according to the drawing speed such that the curing degree K of the semi-cured coating layer after passing through the first curing unit 40A is 0.25 or more.

As Comparative Example 6, from the configuration of Example 1, the positions of the non-contact direction changers 20A to 20C are converted to the position before the coating unit 30. That is, the second cooling unit 14 is not provided between the first curing unit 40A and the second curing unit 40B. The drawing speed is 50 m/sec. Although the coating layer of the optical fiber obtained thereby way is cured, the Young's modulus of the coating layer is reduced by about 20% as compared with Example 1. This is because the cooling in the state of the bare optical fiber 3 is sufficient, but the semi-cured coating layer is heated because the optical fiber passes through the first curing unit 40A, and the optical fiber enters the second curing unit 40B in that state, so the semi-cured coating layer is cured at a state where the temperature thereof is high. Instead of curing the coating layer at one time by one curing unit, when the curing unit is divided into a plurality of curing units, and a cooling unit is provided between the curing units, it is possible to limit rising the temperature of the coating layer while curing.

As described above, according to the manufacturing method of one or more embodiments, there is a second cooling step of cooling the semi-cured coating layer by at least one non-contact direction changer between the first curing step and the second curing step. Thereby, even if the temperature of the semi-cured coating layer rises in the first curing step, the temperature can be lowered in the second cooling step. With this configuration, in the second curing step, the semi-cured coating layer is prevented from being cured while the temperature of the semi-cured coating layer is high, and it is possible to bring the coating layer after curing into a chosen or desired state.

Further, in the second cooling step, the semi-cured coating layer is cooled by the non-contact direction changers 20A to 20C, 20E. The non-contact direction changers 20A to 20C, 20E have high cooling ability to spray gas onto the optical fiber, and can reliably cool the semi-cured coating layer in a short time. Therefore, the drawing speed can be increased. In addition, by cooling the semi-cured coating layer while changing the traveling direction of the optical fiber from the up-down direction to the horizontal direction, for example, by the non-contact direction changers 20A to 20C, 20E, it is possible to prevent the size of the entire device from increasing in the height direction. In addition, it is possible to limit that the semi-cured coating layer comes in contact with the components of the direction changer and is deformed.

Further, when gas is sprayed onto the semi-cured coating layer having a low curing degree K, in the non-contact direction changers 20A to 20C, 20E, the pressure of the gas may cause the semi-cured coating layer to be deformed. Therefore, in the first curing step, the uncured coating layer may be cured until the curing degree K of the semi-cured coating layer becomes 0.25 or more. Thus, it is possible to limit the deformation of the coating layer due to the pressure of the gas of the non-contact direction changers 20A to 20C, 20E.

In the case where the coating layer is a radical-curable ultraviolet-curable resin, if the oxygen concentration of the gas sprayed onto the coating layer is high, curing failure may occur due to oxygen inhibition. Thus, in the second cooling step, the non-contact direction changers 20A to 20C, 20E may set the oxygen concentration of the gas sprayed onto the semi-cured coating layer to 10% or less. Thereby, even if the coating layer is a radical-curable UV curable resin, it is possible to limit the occurrence of curing failure of the coating layer due to oxygen inhibition. Further, the semi-cured coating layer can be cured more reliably.

It should be noted that the technical scope of the present invention is not limited to the above-described embodiments, and various modifications can be made without departing from the spirit of the present invention.

For example, although the cooling cylinder is used as the cooler 12 in the optical fiber manufacturing apparatuses 1A, 1B of one or more embodiments, the cooler 12 having another configuration may be employed. For example, it is also possible to employ a non-contact direction changer as the cooler 12.

Further, although the optical fiber manufacturing apparatuses 1A, 1B of one or more embodiments is equipped with the slow-cooling furnace 11, a configuration not equipped with the slow-cooling furnace 11 may be adopted according to the level of the transmission loss required for the optical fiber.

Further, although the optical fiber manufacturing apparatuses 1A, 1B of one or more embodiments each is equipped with two curing units 40A, 40B, three or more curing units may be provided. In this case, a non-contact direction changer may be disposed between curing units which are separately positioned in a plurality of places.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1A, 1B optical fiber manufacturing apparatus
3 bare optical fiber
10 drawing unit
13 first cooling unit
20A to 20C, 20E non-contact direction changer
30 coating unit
40A first curing unit
40B second curing unit
50 outer diameter measurement unit
90 winder

What is claimed is:

1. An optical fiber manufacturing method comprising:
drawing an optical fiber preform to form a bare optical fiber;
cooling the bare optical fiber;
coating an uncured coating layer that includes a resin precursor on an outer periphery of the bare optical fiber;
curing the uncured coating layer to form a semi-cured coating layer;
further curing the semi-cured coating layer; and
cooling the semi-cured coating layer by at least one non-contact direction changer between the curing of the uncured coating layer and the curing of the semi-cured coating layer, wherein
during the cooling of the semi-cured coating layer, gas is sprayed onto the semi-cured coating layer by the non-contact direction changer, the gas being air whose oxygen concentration has been adjusted to be 10% or less by adding nitrogen.

2. The optical fiber manufacturing method according to claim 1, wherein during the curing of the uncured coating layer, the uncured coating layer is cured until a curing degree of the semi-cured coating layer becomes 0.25 or more.

3. The optical fiber manufacturing method according to claim 1, wherein the semi-cured coating layer is a radical-curable ultraviolet-curable resin that is cured by radical polymerization.

4. The optical fiber manufacturing method according to claim 1, wherein an amount of the gas sprayed onto the semi-cured coating layer is 100 L/min or more and 200 L/min or less.

* * * * *